United States Patent
Noh et al.

(10) Patent No.: US 9,445,423 B2
(45) Date of Patent: Sep. 13, 2016

(54) COMMUNICATION METHOD OF A BASE STATION AND A TERMINAL

(75) Inventors: Won Jong Noh, Yongin-si (KR); Joon Tae Kim, Daejeon (KR); Hyun Ho Choi, Suwon-si (KR); Won Jae Shin, Yongin-si (KR); Dong Jo Park, Daejeon (KR); Chang Yong Shin, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 784 days.

(21) Appl. No.: 13/298,736

(22) Filed: Nov. 17, 2011

(65) Prior Publication Data

US 2012/0155300 A1 Jun. 21, 2012

(30) Foreign Application Priority Data

Dec. 21, 2010 (KR) ......................... 10-2010-0131180

(51) Int. Cl.
*H04W 72/08* (2009.01)
*H04L 1/00* (2006.01)
*H04W 52/30* (2009.01)
*H04W 28/06* (2009.01)

(52) U.S. Cl.
CPC .......... *H04W 72/085* (2013.01); *H04L 1/0026* (2013.01); *H04W 52/30* (2013.01); *H04W 28/06* (2013.01)

(58) Field of Classification Search
None
See application file for complete search history.

(56) References Cited

U.S. PATENT DOCUMENTS

| | | | | |
|---|---|---|---|---|
| 8,538,474 | B2* | 9/2013 | Chen et al. | 455/522 |
| 2005/0129058 | A1 | 6/2005 | Casaccia et al. | |
| 2006/0205357 | A1 | 9/2006 | Kim | |
| 2007/0293260 | A1* | 12/2007 | Xiao et al. | 455/522 |
| 2008/0039129 | A1* | 2/2008 | Li | H04L 1/0003 455/522 |
| 2008/0081634 | A1* | 4/2008 | Kaikkonen et al. | 455/452.1 |
| 2008/0268785 | A1* | 10/2008 | McCoy | H04B 7/0417 455/67.11 |
| 2009/0143074 | A1 | 6/2009 | Pelletier et al. | |
| 2009/0181712 | A1* | 7/2009 | Xu | H04L 1/0026 455/522 |
| 2009/0274041 | A1 | 11/2009 | Chou et al. | |
| 2009/0303952 | A1* | 12/2009 | Hosokawa | 370/329 |
| 2010/0226327 | A1* | 9/2010 | Zhang | H04B 7/0632 370/329 |
| 2010/0278278 | A1* | 11/2010 | Lee | H04B 7/0628 375/267 |

(Continued)

FOREIGN PATENT DOCUMENTS

| | | |
|---|---|---|
| KR | 10-2005-0044219 | 5/2005 |
| KR | 10-2008-0044590 | 5/2008 |

(Continued)

OTHER PUBLICATIONS

Qaseem, Syed et al., "Compressive Sensing For Feedback Reduction In MIMO Broadcast Channels." Telecommunications (ICT), 2010 IEEE 17th International Conference on. IEEE, 2010.

(Continued)

*Primary Examiner* — Chirag Shah
*Assistant Examiner* — Amar Persaud
(74) *Attorney, Agent, or Firm* — NSIP Law (57) ABSTRACT

Provided is a communication method of a base station and a terminal for enhancing a recovery performance of a signal using a feedback control message. The feedback control message may include information about a target received power at the base station with respect to feedback information of each of a plurality of terminals and information associated with a feedback mode of the feedback information.

21 Claims, 9 Drawing Sheets

(56) References Cited

U.S. PATENT DOCUMENTS

| | | | |
|---|---|---|---|
| 2011/0014875 A1* | 1/2011 | Chao | H04W 52/12 455/63.1 |
| 2011/0273997 A1* | 11/2011 | Sumasu | H04L 5/1469 370/252 |
| 2012/0008613 A1* | 1/2012 | Lee | H04B 7/0452 370/338 |
| 2013/0058290 A1* | 3/2013 | Khan | H04L 1/0026 370/329 |
| 2015/0215015 A1* | 7/2015 | Chen | H04L 25/03343 375/267 |

FOREIGN PATENT DOCUMENTS

| | | |
|---|---|---|
| KR | 10-2008-0087364 | 10/2008 |
| KR | 10-2010-0028456 | 3/2010 |

OTHER PUBLICATIONS

Korean Office Action issued on May 19, 2016 in counterpart Korean Application No. 10-2010-0131180. (9 pages with English Translation).

* cited by examiner

COMMUNICATION METHOD OF A BASE STATION AND A TERMINAL

CROSS-REFERENCE TO RELATED APPLICATION(S)

This application claims the benefit under 35 U.S.C. §119 (a) of Korean Patent Application No. 10-2010-0131180, filed on Dec. 21, 2010, in the Korean Intellectual Property Office, the entire disclosure of which is incorporated herein by reference for all purposes.

BACKGROUND

1. Field

The following description relates to a communication method of a base station and a terminal.

2. Description of Related Art

Due to an increase in communication capacity of a communication system and an increasing number of simultaneous hits, feedback information transferred to a base station by a terminal has proportionally increased. As the number of terminals reporting feedback information to the base station increases, and a number of times that a terminal reports a change of a channel increases, a demand for an uplink channel also increases causing more resources to be consumed.

Accordingly, there is a desire for a scheme for reducing the amount of feedback information or a relatively more effective communication scheme in a process using the uplink channel.

SUMMARY

In one general aspect, there is provided a communication method of a base station, the method including transmitting a feedback control message comprising information about a target received power of feedback information of each of a plurality of terminals which is received at the base station, receiving a channel quality indicator of each of the plurality of terminals transmitted with respect to the target received power and information associated with a feedback mode of the feedback information included in the feedback control message, and performing scheduling with respect to the plurality of terminals based on the channel quality indicator of each of the plurality of terminals.

The feedback control message may comprise at least one of information associated with a feedback mode of the feedback information, information about a compressed sensing resource block that is defined in advance for a compressed sensing allocated to the plurality of terminals, information about a target received power of the feedback information of each of the plurality of terminals which is received at the base station, and information about a threshold value of the channel quality indicator.

The feedback mode may indicate whether a compressed sensing resource block defined in advance for a compressed sensing is allocated to the plurality of terminals or whether another resource is allocated to each of the plurality of terminals by the base station.

The feedback mode may include at least one of a first mode in which the base station allocates an orthogonal resource to each of the plurality of terminals, a second mode in which the base station allocates a compressed sensing resource block defined in advance for compressed sensing to each of the plurality of terminals, a third mode in which the base station allocates a compressed sensing resource block defined in advance to a terminal capable of satisfying the target received power, and allocates an orthogonal resource to a terminal incapable of satisfying the target received power, and a fourth mode in which each of the plurality of terminals separately determines a resource to be used based on whether each of the plurality of terminals is capable of satisfying the target received power.

The fourth mode may use the compressed sensing resource block defined in advance if each of the plurality of terminals is capable of satisfying the target received power, and determine a resource to be used by a random access if each of the plurality of terminals is incapable of satisfying the target received power.

The method may further comprise broadcasting information about the target received power or information about a periodic average channel gain to each of the plurality of terminals.

The method may further comprise determining the feedback mode based on a type of feedback information received from the plurality of terminals, wherein the type of feedback information includes at least one of a channel quality indicator with respect to each of the plurality of terminals, information about a battery status of each of the plurality of terminals, information about a service, and information about a buffer status.

The method may further comprise adjusting a value of a target received power at the base station with respect to feedback information of each of the plurality of terminals, based on traffic that is fed back from each of the plurality of terminals.

The method may further comprise adjusting a size of the compressed sensing resource block defined in advance, based on a number of the plurality of terminals that are simultaneously accessing the base station.

In another aspect, there is provided a communication method of a terminal, the method including receiving a feedback control message comprising information about a target received power of feedback information of the terminal which is received at the base station, and transmitting the feedback information based on the target received power and information associated with a feedback mode of the feedback information included in the feedback control message.

The feedback control message may include at least one of information associated with a feedback mode of the feedback information, information about a compressed sensing resource block allocated to the terminal and defined in advance for compressed sensing, information about a target received power of feedback information of the terminal which is received at the base station, and information about a threshold value of a channel quality indicator.

The feedback mode may indicate whether a compressed sensing resource block defined in advance for compressed sensing is allocated to the terminal or whether another resource is allocated to the terminal by the base station.

The feedback mode may include at least one of a first mode in which the base station allocates an orthogonal resource to the terminal, a second mode in which the base station allocates, to the terminal, a compressed sensing resource block defined in advance for compressed sensing, a third mode in which the base station allocates a compressed sensing resource block defined in advance to a terminal capable of satisfying the target received power, and allocates an orthogonal resource to a terminal incapable of satisfying the target received power, and a fourth mode in which the terminal determines a resource to be used based on whether the terminal is capable of satisfying the target received power.

The method may further comprise determining whether the target received power is satisfied if the feedback mode included in the feedback control message corresponds to the third mode, and transmitting the feedback information using the allocated compressed sensing resource block if the target received power is satisfied.

The method may further comprise transmitting the feedback information using the allocated orthogonal resource if the target received power is not satisfied.

The method may further comprise determining whether the target received power is satisfied, and transmitting the feedback information using the compressed sensing resource block defined in advance if the target received power is satisfied, wherein the feedback mode included in the feedback control message corresponds to the fourth mode.

The method may further comprise transmitting the feedback information using a resource acquired by a random access if the target received power is not satisfied.

The compressed sensing resource block defined in advance may be adjusted by the base station based on a number of terminals that are simultaneously accessing the base station.

The information about a target received power of feedback information of the terminal which is received at the base station may be adjusted by the base station based on traffic that is fed back by the terminal.

In another aspect, there is provided a computer-readable storage medium having stored therein program instructions to cause a processor to implement a method including transmitting a feedback control message comprising information about a target received power of feedback information of each of a plurality of terminals which is received at the base station, receiving a channel quality indicator of each of the plurality of terminals transmitted with respect to the target received power and information associated with a feedback mode of the feedback information included in the feedback control message, and performing scheduling with respect to the plurality of terminals based on the channel quality indicator of each of the plurality of terminals.

In another aspect, there is provided a terminal of a compressed sensing (CS) environment in which a plurality of terminals share one or more feedback channels to feedback information to a base station, the terminal including a receiver configured to receive a feedback control message from the base station, a controller for determining a feedback mode from among a plurality of feedback modes with which to transmit feedback information to the base station, based on information included in the feedback control message, and a transmitter for transmitting feedback information to the base station via the determined feedback mode.

The feedback control message may further comprise information about a CS resource block (CS RB) allocated to the plurality of terminals, information about a target receive power value of feedback information at the base station, and information about a threshold value of a channel quality indicator (CQI).

The controller may adjust the transmission power of the transmitter transmitting the feedback information based on information included in the feedback control message, such that the power at which the feedback information is received at the base station satisfies a target receive power value.

The feedback mode included in the feedback control message may indicate whether a CS resource block (CS RB) is allocated to the terminal to transmit feedback information, or whether another resource is allocated to the terminal to transmit feedback information.

Other features and aspects may be apparent from the following detailed description, the drawings, and the claims.

Throughout the drawings and the detailed description, unless otherwise described, the same drawing reference numerals will be understood to refer to the like elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, the description of well-known functions and constructions may be omitted for increased clarity and conciseness.

Figure 1:
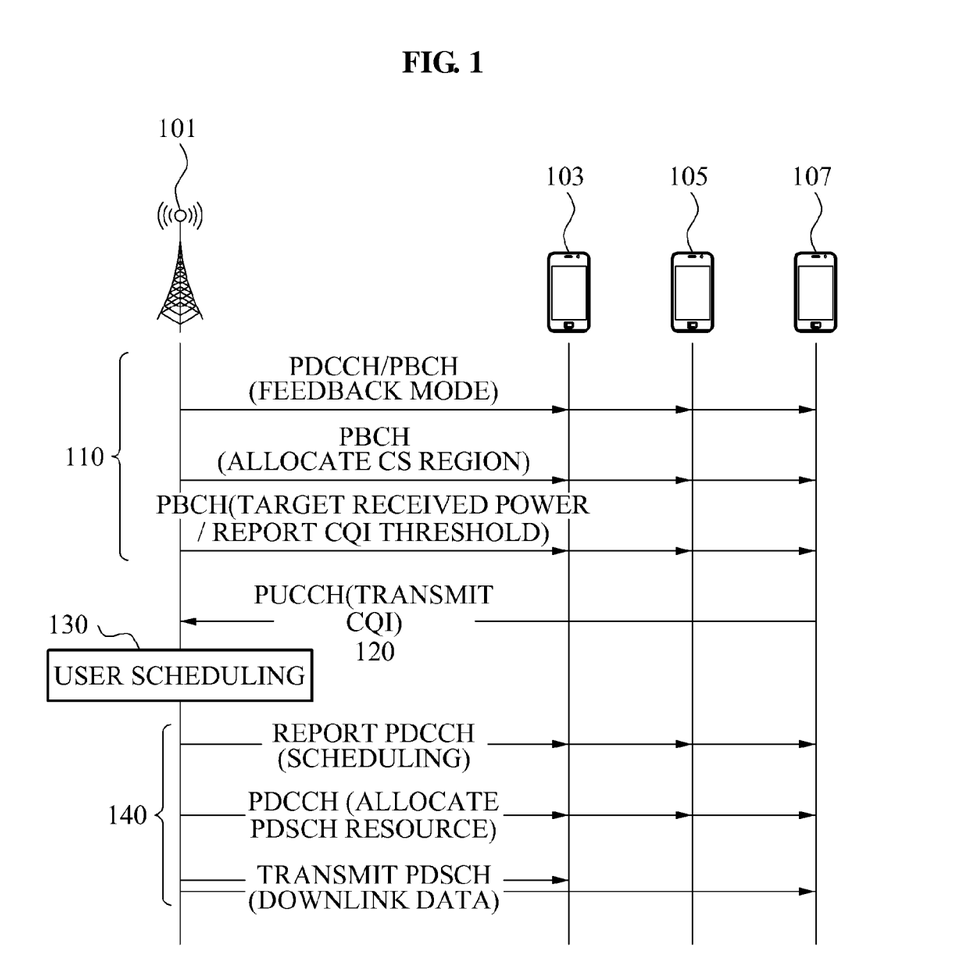
FIG. 1 is a diagram illustrating an example of an uplink feedback scheme based on compressed sensing (CS).

FIG. 1 includes an example of an uplink feedback scheme based on a compressed sensing (CS).

Referring to FIG. 1, a network for an uplink feedback based on a CS includes a base station 101 and a plurality of terminals 103, 105, and 107.

For example, a CS scheme may correspond to a scheme of sampling an analog signal under a Nyquist rate that corresponds to a discrete time signal. The CS scheme may enable an analog signal to be expressed by a smaller number of measurement values, in comparison to a general sampling scheme. The CS scheme may enable an original analog signal to be completely restored from an acquired measurement value, or restored with only a small error. The CS scheme may express a signal without a loss using a smaller number of measurement values, in comparison to a general sampling scheme, to obtain the same result as compressing the signal.

In the CS scheme, each of active terminals may share channels, for example, ten active terminals may share three or four channels, rather than using ten channels to transmit information to a base station. By sharing channels, a feedback resource of an uplink channel may be reduced, while sufficiently transmitting corresponding feedback information to the base station.

In 110, the base station 101 transmits information associated with a feedback mode corresponding to feedback information to each of the plurality of terminals 103, 105, and 107 through a channel, for example, a Physical Downlink Control Channel (PDCCH) or a Physical Broadcasting Channel (PBCH).

In 110, the base station 101 may transmit, for example, information about a compressed sensing resource block (CS RB) that is defined in advance for a CS, information about a target received power at a base station corresponding to feedback information of each of the plurality of terminals 103, 105, and 107, and information about a threshold of a channel quality indicator (CQI) allocated to the plurality of terminals 103, 105, and 107 through the PBCH.

As an example, the above mentioned information may be transmitted to each of the plurality of terminals 103, 105, and 107 by a feedback control message that may be transmitted by the base station 101.

The information associated with the feedback mode may be transmitted to each of the plurality of terminals 103, 105, and 107 through the PDCCH if a corresponding feedback mode is, for example, a third mode in which a resource corresponding to each terminal is allocated by the base station 101. As another example, the information associated with the feedback mode may be transmitted to each of the plurality of terminals 103, 105, and 107 through the PBCH if a corresponding feedback mode is another mode.

In 120, each of the plurality of terminals 103, 105, and 107 receiving the feedback control message transmits the CQI to the base station 101 through a Physical Uplink Control Channel (PUCCH).

Each of the plurality of terminals 103, 105, and 107 may transmit the CQI according to the information about a target received power and the information associated with a feedback mode corresponding to feedback information included in the feedback control message.

In 130, the base station 101 selects several terminals transmitting the CQI using the CS RB, and performs scheduling with respect to the plurality of terminals.

In 130, the base station 101 may use the CQI of each of the plurality of terminals 103, 105, and 107 to perform the scheduling with respect to the plurality of terminals 103, 105, and 107.

In 140, a result of the scheduling performed by the base station 101 may be transmitted to each of the plurality of terminals 103, 105, and 107 through the PDCCH or a Physical Downlink Shared Channel (PDSCH).

In this example, the base station 101 may transmit, for example, a result of the scheduling, information about a resource allocation in the PDSCH, information about downlink data, and the like, to each of the plurality of terminals 103, 105, and 107.

Figure 2:
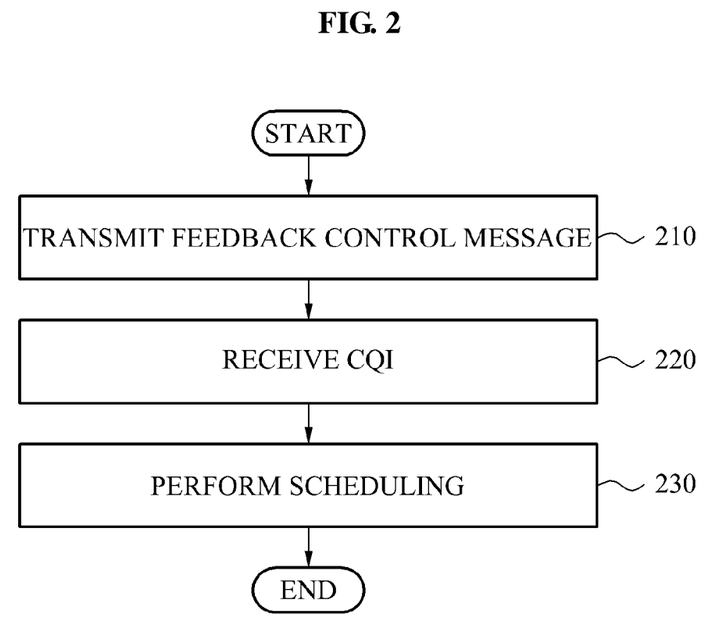
FIG. 2 is a flowchart illustrating an example of a communication method of a base station.

FIG. 2 illustrates an example of a communication method of a base station.

Referring to FIG. 2, in 210, the base station transmits a feedback control message including information about a target received power at the base station corresponding to feedback information of each of a plurality of terminals.

The feedback control message may include, for example, at least one of information associated with a feedback mode corresponding to the feedback information, information about a CS RB that is allocated to the plurality of terminals, information about a target received power at the base station corresponding to feedback information of each of the plurality of terminals, and information about a threshold value of a CQI. The feedback control message and the target received power at the base station are further described with reference to FIG. 4.

Prior to the transmission of the feedback control message, the base station may determine a feedback mode based on a type of the feedback information that is received from the plurality of terminals. For example, the type of the feedback information may include the CQI of each of the plurality of terminals, information about a battery status of each of the plurality of terminals, information about a service state, information about a buffer status, and the like. An example of a service state is a promotional fairness (PF) index.

Figure 5:
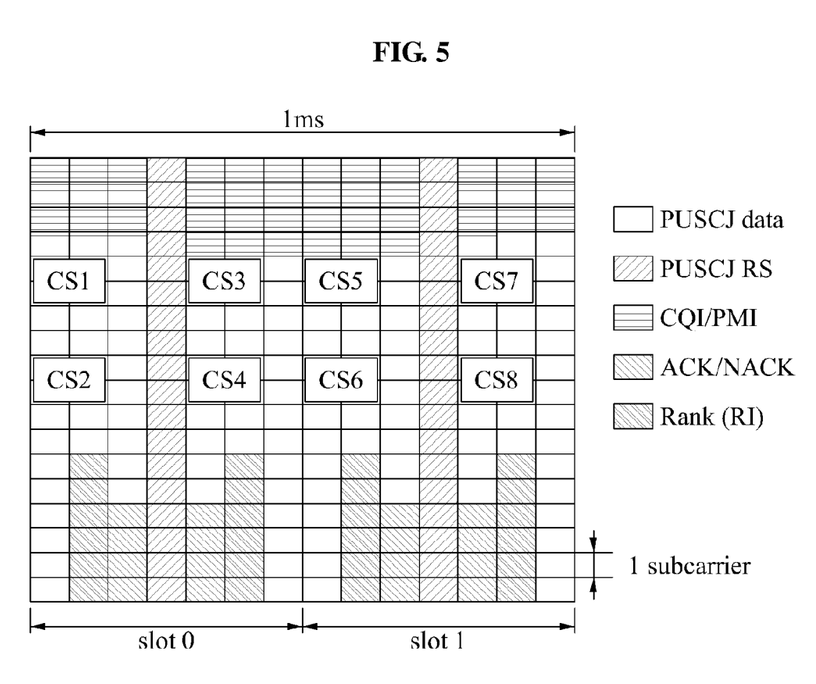
FIG. 5 is a diagram illustrating an example of a compressed sensing resource block (CS RB).

The base station may adjust a size of the CS RB that is defined in advance, based on the number of terminals that are simultaneously accessing the base station. FIG. 5 illustrates an example of the CS RB defined in advance.

In 220, the base station receives the CQI of each of the plurality of terminals transmitted according to information about a target received power and information associated with a feedback mode of the feedback information that is included in the feedback control message.

The feedback mode may indicate whether the CS RB is allocated to the plurality of terminals or whether a resource used for each of the plurality of terminals is allocated by the base station.

Using the feedback mode, each of the plurality of terminals may recognize whether the CS RB is allocated or whether an orthogonal resource is allocated to the each of the plurality of terminals. Using the feedback mode, each of the plurality of terminals may recognize whether a resource used by each of the plurality of terminals for transmitting feedback information is allocated by the base station using a central control scheme, or whether each of the plurality of terminals determines a resource to be used by a separate control scheme.

Figure 4:
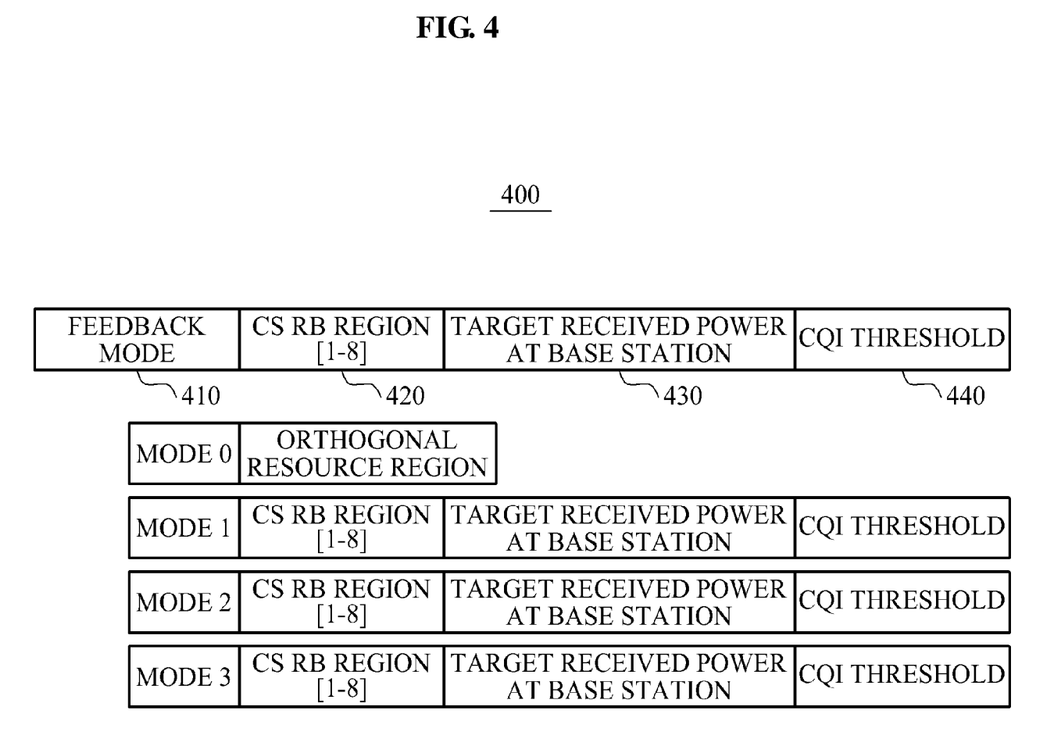
FIG. 4 is a diagram illustrating an example of a feedback control message.

The feedback mode may be classified into four modes based on whether the CS RB is allocated to the plurality of terminals or whether a resource used for each of the plurality of terminals is allocated by the base station. FIG. 4 illustrates an example of the feedback mode.

The base station may broadcast information about the target received power or information about a periodic average channel gain to each of the plurality of terminals. Each of the plurality of terminals may determine a scheme of transmitting feedback information based on the broadcasted information.

Each of the plurality of terminals may recognize information about a channel state from each of the plurality of terminals to the base station by a long term based prediction.

A scheme for each of the plurality of terminals to use to transmit feedback information to the base station includes, for example, an orthogonal scheme, a CS scheme, a random access scheme, and the like.

In 230, the base station performs scheduling with respect to the plurality of terminals using the CQI of each of the plurality of terminals. For example, in 230, the base station may select a terminal transmitting the CQI of the terminal using the CS RB, and may perform the scheduling with respect to the selected terminal.

Figure 3:
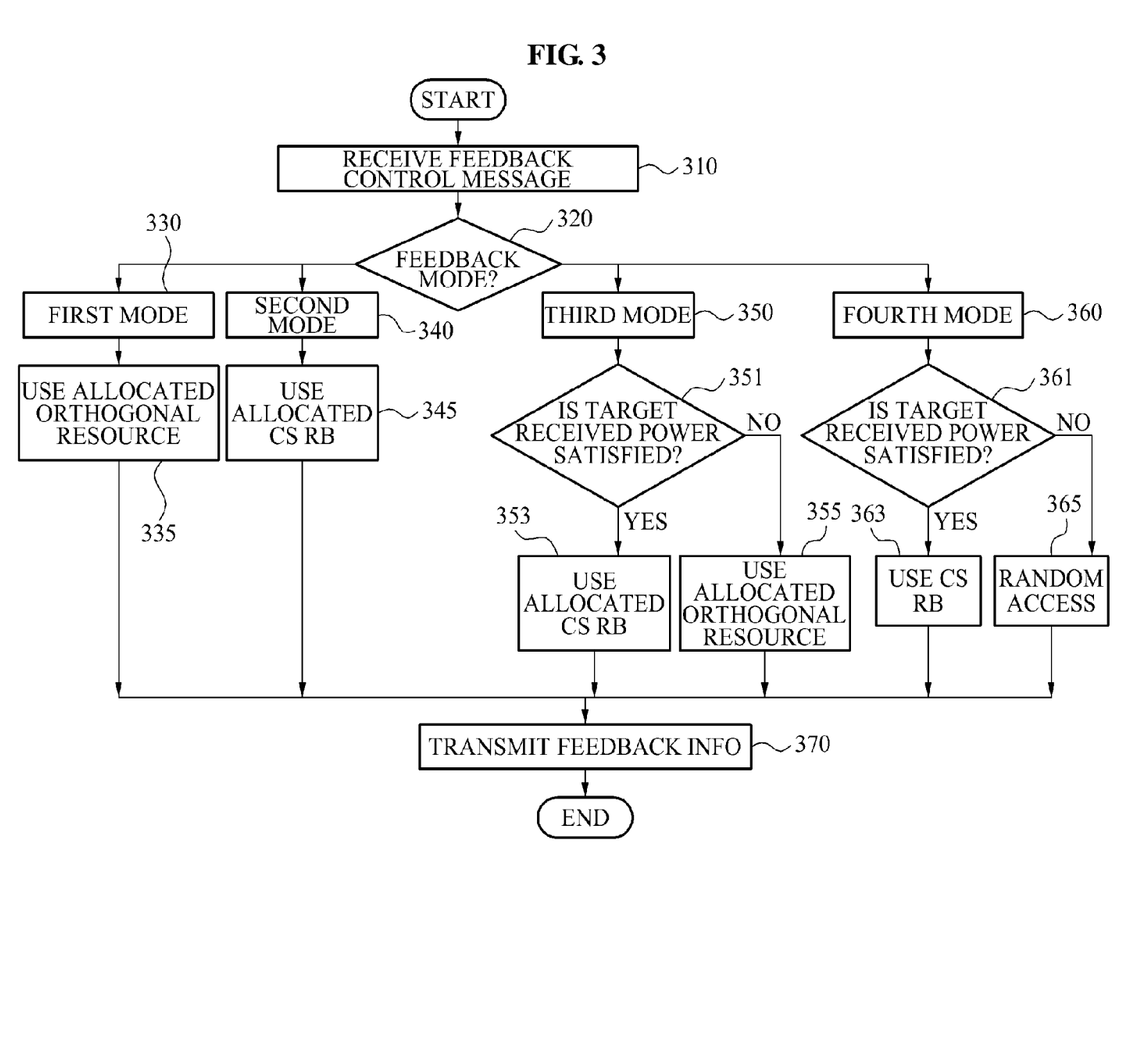
FIG. 3 is a flowchart illustrating an example of a communication method of a terminal.

FIG. 3 illustrates an example of a communication method of a terminal.

Referring to FIG. 3, in 310, the terminal receives a feedback control message. The feedback control message may include information about a target received power at the base station corresponding to feedback information of the terminal.

The feedback control message may include, for example, at least one of information associated with a feedback mode corresponding to the feedback information, information about a CS RB allocated to the terminal and defined in advance for a CS, information about a target received power at the base station corresponding to the feedback information of the terminal, and information about a threshold value of a CQI. In this example, the feedback mode may indicate whether the CS RB is allocated to the terminal or whether a resource used for the terminal is allocated by the base station. FIG. 4 illustrates an example of a feedback control message.

The terminal may transmit feedback information based on information about a target received power and information associated with a feedback mode corresponding to feedback information included in the feedback control message.

In 320, the terminal determines a feedback mode of the terminal, from information associated with a feedback mode of the feedback information included in the feedback control message.

If the feedback mode determined in 320 corresponds to a first mode 330, the terminal uses an orthogonal resource allocated to the terminal by the base station, in 335, to transmit the feedback information to the base station in 370. If the feedback mode determined in 320 corresponds to a second mode 340, the terminal uses a CS RB allocated to the terminal by the base station, in 345, to transmit the feedback information to the base station in 370.

In this example, the CS RB may be defined in advance for a CS, and the base station may adjust a size of the CS RB based on the number of terminals that are accessing the base station at that time. The size of the CS RB corresponds to a number of CS RBs that are allocated to the corresponding terminal.

If the feedback mode determined in 320 corresponds to a third mode 350, the terminal determines whether the terminal is capable of satisfying a target received power, in 351. In this example, information about a target received power at the base station corresponding to feedback information of the terminal, for example, a value of the target received value, may be adjusted by the base station based on traffic that is fed back by the terminal. FIG. 4 illustrates an example of the target received power at the base station.

If the terminal is capable of satisfying the target received power, the terminal uses the CS RB allocated from the base station, in 353, to transmit the feedback information in 370. If the terminal is incapable of satisfying the target received power, the terminal uses the orthogonal resource allocated from the base station, in 355, to transmit the feedback information in 370.

If the feedback mode determined in 320 corresponds to a fourth mode 360, the terminal determines whether the terminal is capable of satisfying the target received power, in 361. If the terminal is capable of satisfying the target received power, the terminal uses the CS RB defined in advance, in 363, to transmit the feedback information in 370.

If the terminal is incapable of satisfying the target received power, in 361, the terminal uses a resource acquired by a contention based random access, in 365, to transmit the feedback information in 370. The terminal may be in a state in which no operation is involved, if the terminal is incapable of satisfying the target received power.

In 370, the feedback information is transmitted to the base station.

FIG. 4 illustrates an example of a feedback control message.

Referring to FIG. 4, the feedback control message 400 includes an information field 410 associated with a feedback mode, an information field 420 corresponding to a CS RB, an information field 430 corresponding to a target received power at a base station, and an information field 440 about a threshold value of a CQI.

The information field 410 associated with a feedback mode of feedback information of each of a plurality of terminals may indicate a feedback mode for the feedback information of each of the plurality of terminals.

As described herein, the feedback mode may be classified into four modes based on whether a CS RB is defined in advance for a CS that is allocated to the plurality of terminals or whether a resource used for each of the plurality of terminals is allocated by the base station.

For example, in a first mode, the base station may allocate an orthogonal resource to each of the plurality of terminals. In a second mode, the base station may allocate a CS RB that is defined in advance for a CS to each of the plurality of terminals. In a third mode, the base station may allocate the CS RB that is defined in advance for a CS, to a terminal that is capable of satisfying a target received power, and may allocate the orthogonal resource, that is, an orthogonal feedback channel, to a terminal that is incapable of satisfying the target received power.

In a fourth mode, each of the plurality of terminals may separately determine a resource to be used, based on whether each respective terminal is capable of satisfying the target received power. In the fourth mode, a terminal may use the CS RB that is defined in advance if a transmission power of the respective terminal transmitting feedback information is capable of satisfying the target received power. On the other hand, the terminal may determine a resource to be used by a random access if the target received power is not satisfied.

The information field 420 corresponding to a CS RB may include information about the CS RB that is defined in advance for sensing and which is allocated to the plurality of terminals.

If a feedback mode in the information field 410 corresponds to the first mode, information about an orthogonal resource region allocated from the base station may be recorded in the information field 420 corresponding to a CS RB. As an example, a value of 0 in the information field 410 may be used to indicate the first mode.

If the information field 410 indicates that another mode besides the first mode, such as the second mode (that may be represented by 1) through the fourth mode (that may be represented by 3), information about a region of a CS RB, for example, information about a number of CS RBs used by a corresponding terminal may be recorded in the information field 420 corresponding to the CS RB.

To enhance a signal recovery performance of feedback information of a plurality of terminals which are received at the base station, the information field 430 corresponding to a target received power at the base station, may include information about the target received power that the base station desires to receive from each of the plurality of terminals, for example, a value of the target received value.

If normalization is performed so that all received powers that are received at the base station, from each of the plurality of terminals, are equal to each other, a performance of a signal recovered by a CS recovery algorithm may be significantly improved.

For example, a target received power the base station desires to receive from each of the plurality of terminals may correspond to 10, and each of three terminals, that is, terminal A, terminal B, and terminal C, may transmit a signal to the base station.

In this example, terminal A, terminal B, and terminal C may be put in different environments, and a transmission power corresponding to a signal transmitted by each terminal, and a received power received by the base station, may be different from each other for each terminal.

However, as described herein, to enhance a recovery performance of a received signal received at the base station it may be desirable to have each received signal be equal to a predetermined value, and in this case, the predetermined value corresponds to 10.

The base station may control a transmission power of each of the plurality of terminals so that a received power of a signal received at the base station from each of the respective plurality of terminals may be constant.

In this example, the received power the base station desires to receive from each of the plurality of terminals may be referred to as a target received power $P_{BS}$ and may be determined by the following Equation 1.

$$P_{BS} = \frac{N_0}{\sigma_{tar}^2} \frac{\text{trace}(E_A\{(A_{S_{max}}^H A_{S_{max}})^{-1}\})}{S_{max}} \triangleq \frac{N_0 \bar{e}}{\sigma_{tar}^2} \quad \text{[Equation 1]}$$

In this example, $S_{max}$ indicates a maximum sparsity, $\sigma_{tar}^2$ indicates a difference between an actual power value of a signal transmitted from the terminal to the base station and a received power value recovered by the base station, and $N_0$ indicates a received noise variance. $\sigma_{tar}^2$ may also be referred to as an error variance being a target in a least square.

$E_A$ indicates a mean value, $A_{S_{max}}$ indicates a number of measured channels configured by $S_{max}$ columns and having a size of M×1, and $A_{S_{max}}^H$ indicates a Hermitian with respect to $A_{S_{max}}$.

If $S_{max}$ is a predetermined value in Equation 1, $$\bar{e} \triangleq \frac{\text{trace}(E_A\{(A_{S_{max}}^H A_{S_{max}})^{-1}\})}{S_{max}}$$

may also be fixed and thus, $P_{BS}$ may be easily and linearly calculated.

In this example, a reception performance according to a value of $P_{BS}$, may largely vary based on a used CS recovery algorithm and various schemes. However, most CS recovery algorithms may consider an estimated algorithm, such as the least square, to search for a corresponding signal when a sparsity pattern is determined.

As described herein, a target received power $P_{BS}$ may be determined by a minimum value satisfying a predetermined criterion on the least square. In this example, the base station may separately report, to each of the plurality of terminals, a transmission power of each of the plurality of terminals that each of the plurality of terminals is to be informed of, so that the base station may receive feedback information of each of the plurality of terminals with the target received power $P_{BS}$.

Each of the plurality of terminals may estimate the transmission power of each of the plurality of terminals using a performance of an uplink that is obtained through a downlink, or each of the plurality of terminals may estimate the transmission power based on a long-term channel.

The base station may set a value of the target received power $P_{BS}$, at the base station, with respect to feedback information of each of the plurality of terminals, based on traffic that is fed back from each of the plurality of terminals.

FIG. 5 illustrates an example of a CS RB.

Referring to FIG. 5, the CS RB may correspond to a resource region defined in advance for a CS, and a base station may adjust a size of the CS RB defined in advance based on a number of a plurality of terminals that are simultaneously accessing the base station.

For example, if eight CS RBs are assumed to be defined in advance, the adjusting of a size of the CS RB may adjust a number of CS RBs to be used by each of the plurality of terminals, to transmit feedback information. The base station may record information about a number of CS RBs to be used by a corresponding terminal, in the information field 420 corresponding to a CS RB, if the base station transmits a feedback control message to each of the plurality of terminals.

As an example, the base station may dynamically adjust a size of the CS RB by allocating four CS RBs, that is, CS1 through CS4, among eight CS RBs, that is, CS1 through CS8 if a number of terminals simultaneously accessing the base station is relatively large, and by allocating a single CS RB, that is, CS1, or two CS RBs, that is, CS1 and CS2 if a number of terminals simultaneously accessing the base station is relatively small.

Figure 6:
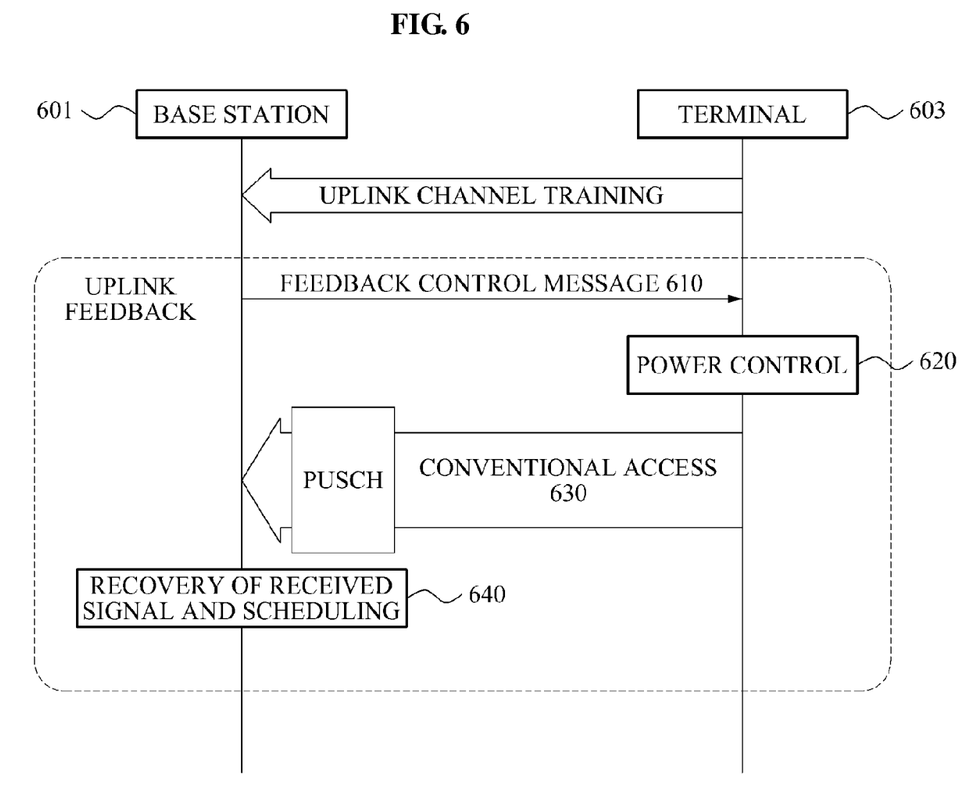
FIG. 6 is a diagram illustrating an example in which a base station allocates the same resource to a plurality of terminals using a feedback control message.

FIG. 6 illustrates an example in which a base station allocates the same resource to a plurality of terminals using a feedback control message.

FIG. 6 illustrates an example in which each of a plurality of terminals transmit feedback information to a base station 601 using the same scheme such as a first mode and a second mode from among above-mentioned feedback modes. In this example, each of the plurality of terminals use the same resource allocated from the base station 601 when transmitting the feedback information.

Hereinafter, an operation between the base station 601 and a single terminal 603 among the plurality of terminals is described as an example.

In 610, the base station 601 transmits a feedback control message to the terminal 603. For example, the feedback control message may include information associated with a feedback mode of the feedback information, information about a CS RB that is defined in advance for a CS allocated to the plurality of terminals, information about a target received power at the base station 601 corresponding to the feedback information of each of the plurality of terminals, information about a threshold value of a CQI, and the like.

In 620, the terminal 603 that receives the feedback control message adjusts a transmission power of the feedback information transmitted by the terminal 603 to the base station 601, based on information associated with a feedback mode and information about a target received power included in the feedback control message.

Accordingly, the base station 601 may receive feedback information with the same received power from each of the plurality of terminals. The received power of the feedback information of each of the plurality of terminals may be adjusted to a target received power.

Thereafter, in 630, the terminal 603 transmits feedback information to the base station 601 according to an access scheme through a PUSCH.

For example, if the feedback mode corresponds to the first mode, the terminal 603 may transmit the feedback information, using a contention based scheme in an allocated orthogonal resource region, through an orthogonal scheme.

As another example, if the feedback mode corresponds to the second mode, the terminal 603 may transmit the feedback information without a contention based scheme, using a CS RB region that is defined in advance for a CS and allocated to the terminal 603, through a CS scheme.

In 640, the base station 601 receiving the feedback information recovers the received feedback information by applying a general scheme according to an orthogonal scheme or a CS recovery algorithm, and performs scheduling.

Figure 7:
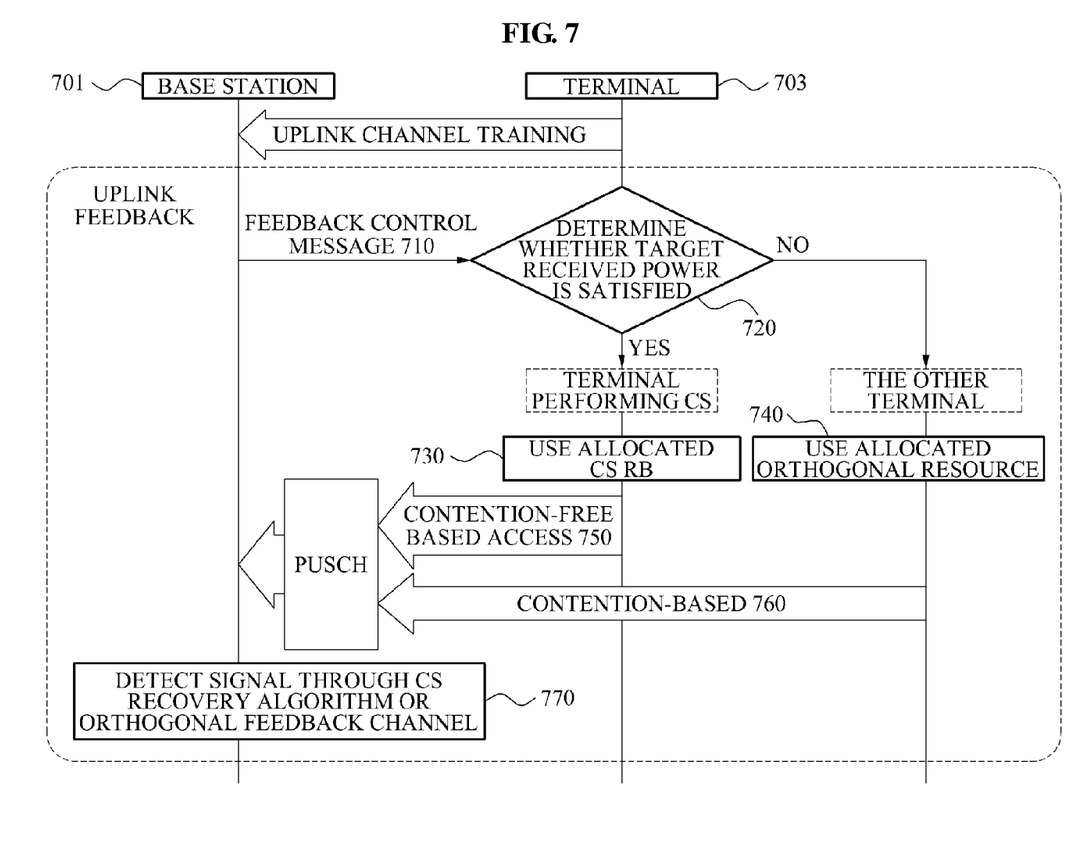
FIG. 7 is a diagram illustrating an example in which a base station controls a resource that is allocated to each of a plurality of terminals using a feedback control message.

FIG. 7 illustrates an example in which a base station controls a resource allocated to each of a plurality of terminals using a feedback control message.

FIG. 7 illustrates an example in which a base station 701 controls a mode of each of plurality of terminals, such as, the third mode from among the previously mentioned modes, and controls a resource allocated to each of the plurality of terminals.

Referring to FIG. 7, an operation between the base station 701 and a single terminal 703 from among the plurality of terminals is described as an example.

In 710, the base station 701 transmits the feedback control message to the terminal 703. The feedback control message may include the same information as the feedback control message of FIG. 6.

In 720, the terminal 703 receiving the feedback control message determines whether the terminal 703 is capable of satisfying a target received power, based on the target received power indicated in the feedback control message, and whether the terminal 703 is capable of transmitting feedback formation so that the base station 701 may receive the feedback information using the target received power.

If the terminal 703 can satisfy the target received power, the terminal 703 transmits the feedback information using a CS RB that is defined in advance and allocated by the base station 701, in 730. In 750, the terminal 703 transmits the feedback information to the base station 701 without a contention based scheme through a BUSCH.

If the terminal 703 is incapable of satisfying the target received power in 720, the terminal 703 uses an orthogonal resource such as an orthogonal feedback channel allocated by the base station 701, in 740, and contentiously transmits the feedback information, in 760.

If the feedback information by the CS RB is defined in advance, the base station 701 detects, that is, recovers the feedback information by a CS recovery algorithm, in 770. In a case of receiving the feedback information by a contention based orthogonal resource, the base station 701 detects, that is, recovers the feedback information by applying a general scheme according to an orthogonal scheme, in 770.

Figure 8:
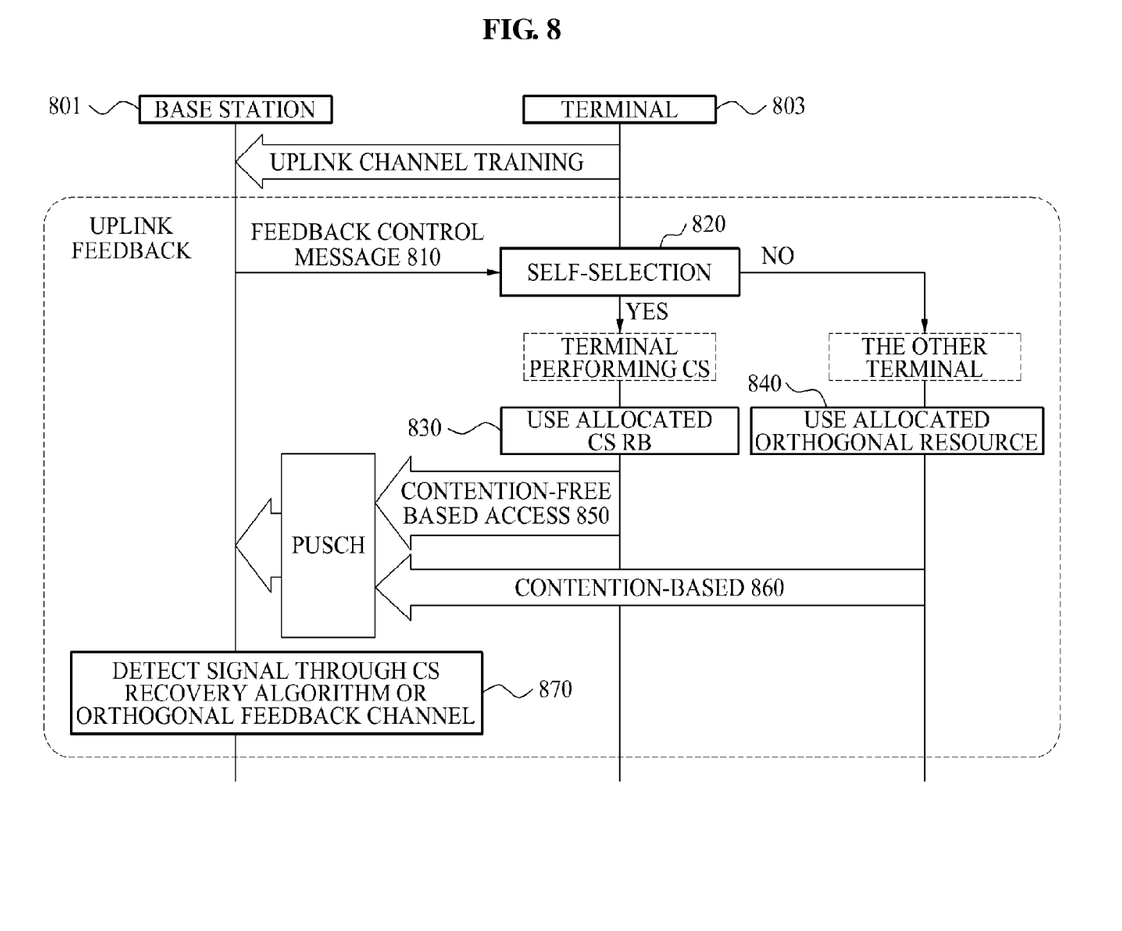
FIG. 8 is a diagram illustrating an example in which each terminal separately determines a resource to be used by the terminal according to a feedback control message.

FIG. 8 illustrates an example in which each terminal separately determines a resource to be used by the terminal according to a feedback control message.

FIG. 8 illustrates an example in which each of a plurality of terminals separately determines a transmission scheme and a source to be used by each of the plurality of terminals such as a fourth mode from among the above-mentioned feedback modes.

Referring to FIG. 8, an operation between a base station 801 and a single terminal 803 among the plurality of terminals is described as an example.

In 810, the base station 801 transmits a feedback control message to the terminal 803.

In this example, the feedback control message may include the same information as the feedback control message of FIG. 6, and may include only information about a threshold value of a CQI and information about a target received power at the base station 801 corresponding to feedback information of each of the plurality of terminals.

In 820, the terminal 803 selects a transmission scheme and a resource to be used by the terminal 803 using the information about a target received power.

In 820, the terminal 803 may determine whether the terminal is capable of satisfying the target received power, that is, whether the terminal is capable of transmitting information so that the base station 801 may receive the feedback information at the target received power.

If it is determined that the target received power is capable of being satisfied, the terminal 803 transmits the feedback information using a CS RB that is defined in advance, in 830.

If the terminal 803 is capable of satisfying the target received power, the corresponding terminal 803, transmits the feedback information without a contention based scheme through a PUSCH, in 850.

If the terminal 803 is incapable of satisfying the target received power in 820, the terminal 803 uses an orthogonal resource such as an orthogonal feedback channel allocated by the base station 801, in 840, and contentiously transmits the feedback information through the PUSCH, in 860.

In response to receiving the feedback information by a CS RB defined in advance, the base station 801 detects, that is, recovers a received signal, in 870. For example, the base station may recover the feedback information by a CS recovery algorithm in 870. In 870, the base station 801 receiving the feedback information by a contention based orthogonal resource detects, that is, recovers the received signal by applying a general scheme according to an orthogonal scheme.

Figure 9:
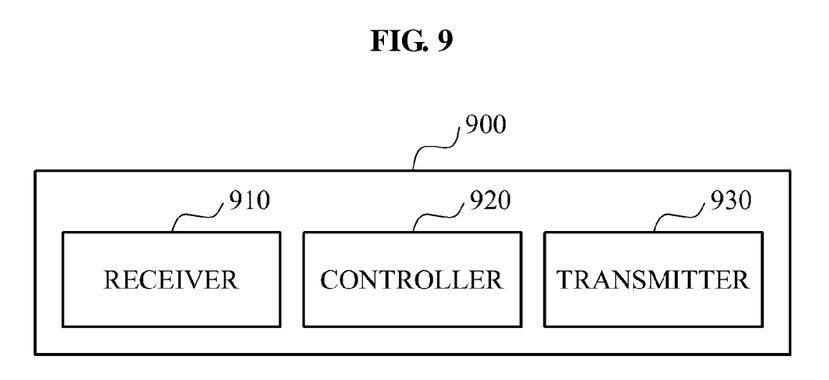
FIG. 9 is a diagram illustrating an example of a terminal.

FIG. 9 illustrates an example of a terminal.

Referring to FIG. 9, terminal 900 is a terminal that may be included in a compressed sensing (CS) environment in which a plurality of terminals share one or more feedback channels to feedback information to a base station. The terminal 900 includes a receiver 910, a controller 920, and a transmitter 930.

For example, the receiver 910 may receive a feedback control message from the base station. The feedback control message may include one or more of a feedback mode, information about a CS resource block (CS RB) allocated to the plurality of terminals, information about a target receive power value of feedback information at the base station, and information about a threshold value of a channel quality indicator (CQI).

For example, feedback mode included in the feedback control message may indicate whether a CS resource block (CS RB) is allocated to the terminal 900 to transmit feedback information, or whether another resource is allocated to the terminal 900 to transmit feedback information.

The controller 920 may determine a feedback mode from among a plurality of feedback modes with which to transmit feedback information to the base station, based on information included in the feedback control message. The transmitter 930 may transmit the feedback information to the base station via the determined feedback mode.

For example, the controller 920 may determine a transmission power with which to transmit the feedback information to the base station. In this example, the controller 920 may adjust the transmission power of the transmitter 930 transmitting the feedback information based on information included in the feedback control message, such that the power at which the feedback information is received at the base station satisfies a target receive power value.

As described herein by various examples, by controlling a transmission power of a terminal using information about a target received power of feedback information at a base station, a demand for a feedback resource with respect to an uplink channel, and a recovery performance of a signal received by the base station may be enhanced.

As described herein by various examples, by including a feedback mode of the feedback information in a feedback control message, and transmitting the feedback control message, a transmission scheme and a resource used for transmitting feedback information by a terminal may be diversified.

Program instructions to perform a method described herein, or one or more operations thereof, may be recorded, stored, or fixed in one or more computer-readable storage media. The program instructions may be implemented by a computer. For example, the computer may cause a procesor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a base station, the method comprising:
   transmitting a feedback control message comprising information about a target received power of feedback information of each of a plurality of terminals which is received at the base station, the target received power having a minimum value set for the base station;
   receiving a channel quality indicator of each of the plurality of terminals transmitted with respect to the target received power and information associated with a feedback mode of the feedback information included in the feedback control message; and
   performing scheduling with respect to the plurality of terminals based on the channel quality indicator of each of the plurality of terminals,
   wherein the feedback mode indicates whether a compressed sensing resource block defined in advance for a compressed sensing is allocated to the plurality of terminals or whether another resource is allocated to each of the plurality of terminals by the base station, and
   wherein the feedback mode includes at least one of a third mode in which the base station allocates a compressed sensing resource block defined in advance to a terminal capable of satisfying the target received power, and allocates an orthogonal resource to a terminal incapable of satisfying the target received power, and a fourth mode in which each of the plurality of terminals separately determines a resource to be used based on whether each of the plurality of terminals is capable of satisfying the target received power.

2. The method of claim 1, wherein the feedback control message comprises at least one of information associated with a feedback mode of the feedback information, information about a compressed sensing resource block that is defined in advance for a compressed sensing allocated to the plurality of terminals, information about the target received power of the feedback information of each of the plurality of terminals which is received at the base station, and information about a threshold value of the channel quality indicator.

3. The method of claim 1, wherein the feedback mode includes at least one of a first mode in which the base station allocates an orthogonal resource to each of the plurality of terminals, and a second mode in which the base station allocates a compressed sensing resource block defined in advance for compressed sensing to each of the plurality of terminals.

4. The method of claim 3, wherein the fourth mode uses the compressed sensing resource block defined in advance if each of the plurality of terminals is capable of satisfying the target received power, and determines a resource to be used by a random access if each of the plurality of terminals is incapable of satisfying the target received power.

5. The method of claim 3, further comprising:
adjusting a size of the compressed sensing resource block defined in advance, based on a number of the plurality of terminals that are simultaneously accessing the base station.

6. The method of claim 1, further comprising:
broadcasting information about the target received power or information about a periodic average channel gain to each of the plurality of terminals.

7. The method of claim 1, further comprising:
determining the feedback mode based on a type of feedback information received from the plurality of terminals,
wherein the type of feedback information includes at least one of a channel quality indicator with respect to each of the plurality of terminals, information about a battery status of each of the plurality of terminals, information about a service, and information about a buffer status.

8. The method of claim 1, further comprising:
adjusting a value of the target received power at the base station with respect to feedback information of each of the plurality of terminals, based on traffic that is fed back from each of the plurality of terminals.

9. A communication method of a terminal, the method comprising:
receiving a feedback control message comprising information about a target received power of feedback information of the terminal which is received at a base station, the target received power having a minimum value set for the base station; and
transmitting the feedback information based on the target received power and information associated with a feedback mode of the feedback information included in the feedback control message,
wherein the feedback mode indicates whether a compressed sensing resource block defined in advance for compressed sensing is allocated to the terminal or whether another resource is allocated to the terminal by the base station, and
wherein the feedback mode includes at least one of a third mode in which the base station allocates a compressed sensing resource block defined in advance to a terminal capable of satisfying the target received power, and allocates an orthogonal resource to a terminal incapable of satisfying the target received power, and a fourth mode in which each of the plurality of terminals separately determines a resource to be used based on whether each of the plurality of terminals is capable of satisfying the target received power.

10. The method of claim 9, wherein the feedback control message includes at least one of information associated with a feedback mode of the feedback information, information about a compressed sensing resource block allocated to the terminal and defined in advance for compressed sensing, information about the target received power of feedback information of the terminal which is received at the base station, and information about a threshold value of a channel quality indicator.

11. The method of claim 10, wherein the compressed sensing resource block defined in advance is adjusted by the base station based on a number of terminals that are simultaneously accessing the base station.

12. The method of claim 9, wherein the feedback mode includes at least one of a first mode in which the base station allocates an orthogonal resource to the terminal and a second mode in which the base station allocates, to the terminal, a compressed sensing resource block defined in advance for compressed sensing.

13. The method of claim 12, further comprising:
determining whether the target received power is satisfied if the feedback mode included in the feedback control message corresponds to the third mode; and
transmitting the feedback information using the allocated compressed sensing resource block if the target received power is satisfied.

14. The method of claim 13, further comprising:
transmitting the feedback information using the allocated orthogonal resource if the target received power is not satisfied.

15. The method of claim 12, further comprising:
determining whether the target received power is satisfied; and
transmitting the feedback information using the compressed sensing resource block defined in advance if the target received power is satisfied,
wherein the feedback mode included in the feedback control message corresponds to the fourth mode.

16. The method of claim 15, further comprising:
transmitting the feedback information using a resource acquired by a random access if the target received power is not satisfied.

17. The method of claim 9, wherein the information about the target received power of feedback information of the terminal which is received at the base station is adjusted by the base station based on traffic that is fed back by the terminal.

18. A non-transitory computer-readable storage medium having stored therein program instructions to cause a processor to implement a method comprising:
transmitting a feedback control message comprising information about a target received power of feedback information of each of a plurality of terminals which is received at a base station, the target received power being a minimum value set for the base station;
receiving a channel quality indicator of each of the plurality of terminals transmitted with respect to the target received power and information associated with a feedback mode of the feedback information included in the feedback control message; and
performing scheduling with respect to the plurality of terminals based on the channel quality indicator of each of the plurality of terminals,
wherein the feedback mode indicates whether a compressed sensing resource block defined in advance for a compressed sensing is allocated to the plurality of terminals or whether another resource is allocated to each of the plurality of terminals by the base station, and
wherein the feedback mode includes at least one of a third mode in which the base station allocates a compressed sensing resource block defined in advance to a terminal capable of satisfying the target received power, and allocates an orthogonal resource to a terminal incapable of satisfying the target received power, and a fourth mode in which each of the plurality of terminals separately determines a resource to be used based on whether each of the plurality of terminals is capable of satisfying the target received power.

19. A terminal of a compressed sensing (CS) environment in which a plurality of terminals share one or more feedback channels to feedback information to a base station, the terminal comprising:
- a receiver configured to receive, from the base station, a feedback control message comprising information about a target receive power value of feedback information, the target received power value being a minimum value set for the base station;
- a controller configured to determine a feedback mode from among a plurality of feedback modes with which to transmit feedback information to the base station, based on information included in the feedback control message; and
- a transmitter configured to transmit feedback information to the base station via the determined feedback mode,
- wherein the feedback mode included in the feedback control message indicates whether a CS resource block (CS RB) is allocated to the terminal to transmit feedback information, or whether another resource is allocated to the terminal to transmit feedback information, and
- wherein the feedback mode includes at least one of a third mode in which the base station allocates a compressed sensing resource block defined in advance to a terminal capable of satisfying the target received power, and allocates an orthogonal resource to a terminal incapable of satisfying the target received power, and a fourth mode in which each of the plurality of terminals separately determines a resource to be used based on whether each of the plurality of terminals is capable of satisfying the target received power.

20. The terminal of claim 19, wherein the feedback control message further comprises information about a CS resource block (CS RB) allocated to the plurality of terminals, and information about a threshold value of a channel quality indicator (CaI).

21. The terminal of claim 19, wherein the controller adjusts the transmission power of the transmitter transmitting the feedback information based on information included in the feedback control message, such that the power at which the feedback information is received at the base station satisfies the target receive power value.

* * * * *